Figure 3:
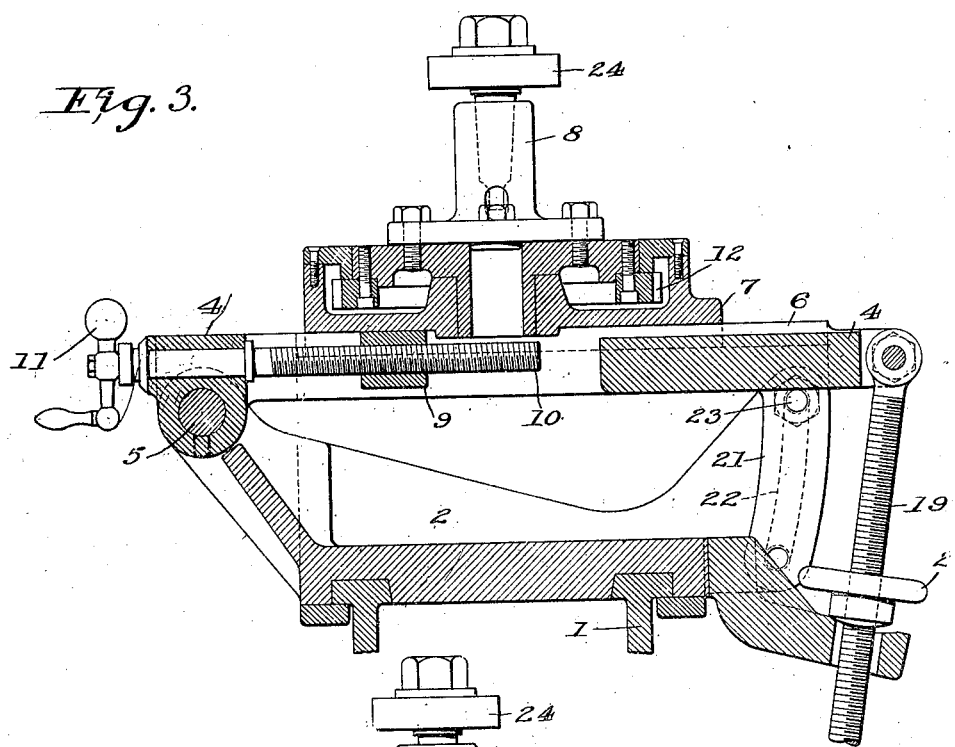

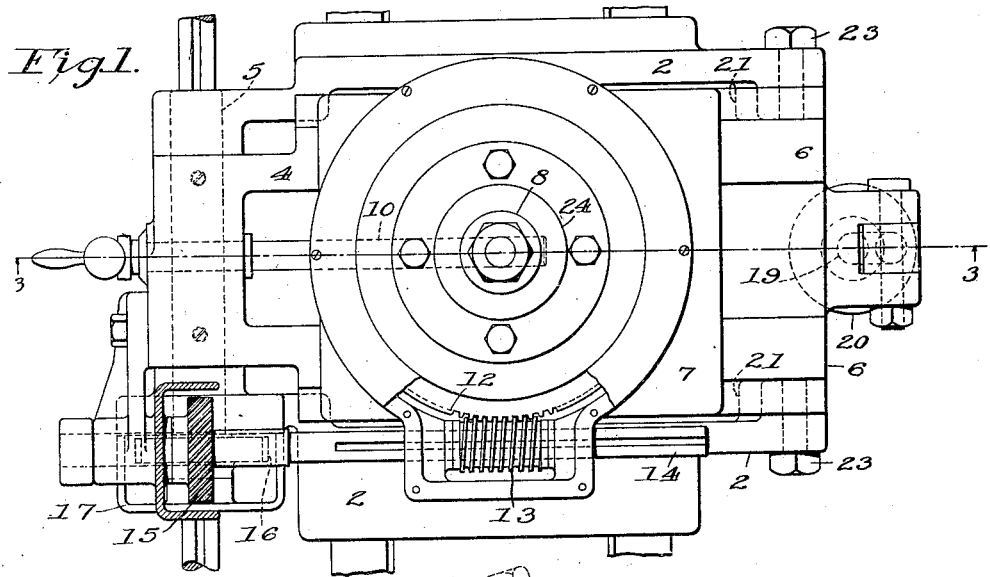
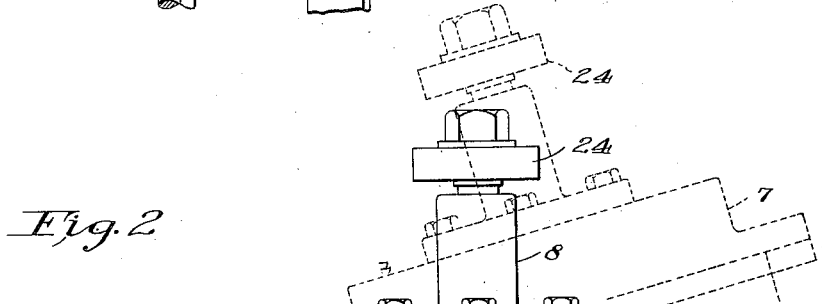

Feb. 2, 1932.   R. R. WEDDELL   1,843,794
ADJUSTABLE WORK HOLDER
Filed June 28, 1927   2 Sheets-Sheet 2

Inventor
Ralph R. Weddell
By Attorney
Nathan & Bowman

Patented Feb. 2, 1932

1,843,794

UNITED STATES PATENT OFFICE

RALPH R. WEDDELL, OF SHELTON, CONNECTICUT, ASSIGNOR TO THE O. K. TOOL COMPANY, INC., OF NEW YORK, N. Y., A CORPORATION OF NEW YORK

ADJUSTABLE WORK HOLDER

Application filed June 28, 1927. Serial No. 202,068.

This invention is concerned with an improved type of adjustable work holder adapted to be applied to conventional types of machine tools whereby a blank work piece may be rotated, tilted and moved bodily to various definite selected positions relative to the cutting tool and firmly held in such position for the cutting operation.

Various ingenious types of work holders, jigs and fixtures have been developed but often these are designed with a specific type of work in mind and accordingly are either limited in their applicability or require a specially built machine tool in order fully to take advantage of the adjustable features thereof.

The present work holder is disclosed and described in its application to the machining of circular work blanks which are to receive cuts at definite positions and angles in the periphery thereof, such as a gear or as is specifically shown and described herein a machine tool cutter body member.

Machine tool cutters of the inserted blade type require a body member with slots cut in the periphery thereof adapted to receive the cutter blade. These slots may extend in various directions dependent upon the type of cutter to be manufactured. They may extend radially thereof or at an angle to a radial line. In the other direction they may likewise be parallel to or at an angle to the cutter axis.

It is an object of this invention to provide a universally adjustable work holder capable of presenting the work to the cutter in such a manner as to be able to accomplish openings in the work blanks, such openings to be in accordance with the many and varied types of work to be machined.

It is a further object to provide such a work holder, which may be quickly and accurately adjusted to adapt the holder to the different types of work and to rigidly and securely hold the work blank in the adjusted positions.

Another feature which is usually attendant upon the machining operations is that of accurately positioning the machined openings at definite and equally spaced points around the work blank as is the case in the cutting of gears or the body supporting members of a cutter itself. A convenient manner of accomplishing this is by the use of indexing means such as are now found in many conventional and general types of machines. This invention includes as one of its objects the novel adaptation of the universal adjustable work holder to a well known machine tool of this type whereby an indexing shaft thereof is directly connected to the work supporting arbor of the work holder to impart an indexing movement thereto whereby the work blank is successively rotated the desired amounts in accordance with the type of work to be manufactured. With the incorporation of this adjustable work holder in a conventional machine of this type such machine is rendered far more flexible and universal in its application.

The objects also include such an arrangement of the driving mechanism for transferring the indexing movement to the work arbor that the work may be translated or tilted in various directions relative to the cutter without disconnecting the driving mechanism or in any manner interfering with it so as to destroy the proper relation of the working parts. The drive consists of a series of gears and machine elements forming a positive and constant connection to the arbor. Still other objects of the invention reside in the simple, compact, and rigid features of construction whereby a work holder is attained capable of being adjusted to rigidly support the work in practically any desired position without restorting to a series of supports each having a complicated operating means for the adjustment thereof.

Other objects and advantages will be in part indicated in the following description and in part rendered apparent therefrom in connection with the annexed drawings.

To enable others skilled in the art so fully to apprehend the underlying features hereof that they may embody the same in the various ways contemplated by this invention, drawings depicting a preferred typical construction have been annexed as a part of this disclosure and, in such drawings, like characters of reference denote corresponding parts throughout all the views, of which:—

Figure 4:
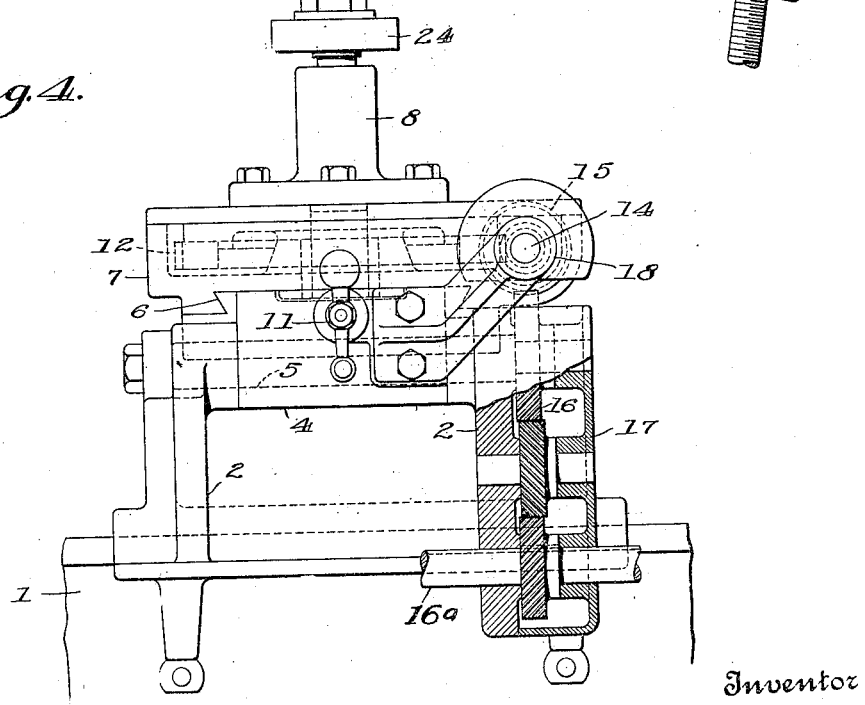

Referring to the drawings, Fig. 1 is a plan view of the fixture with parts of the gear housing broken away; Fig. 2 is a side view, the dotted lines showing the arbor in a tilted position; Fig. 3 is a vertical section on the lines 3—3 of Fig. 1; Fig. 4 is an end view taken at the left hand of Fig. 3 with parts thereof shown in sections.

The frame of a machine is indicated at 1 (Figs. 1 and 2) on which is slidably mounted the base member 2. There is shown a bottom supporting member 4, which is pivotally mounted on shaft 5 (Figs. 3 and 4), which in turn is supported by the base member 2. This bottom support 4 is formed with guideways 6 and on these guideways is mounted the slide 7. The arbor 8 is rotatively mounted on the slide as indicated in Fig. 3, and the lip 9 projects below the slide 7 having a screw threaded opening through which the screw threaded rod 10 projects. By means of the handle 11 the rod 10 controls the adjustment of the slide 7 on the guideways 6. The flange 12 of the arbor 8 is formed with teeth which are in mesh with the worm gear 13 mounted on the slotted shaft 14, which has at its outer end the upper spiral gear 15 (Fig. 2) which is in mesh with the upper indexing gear 16 of the series of indexing gears which are mounted in bearings in the base member 2. The lowest one of these indexing gears 16 is splined on the normal indexing shaft 16ª provided in this general type of machine. The plate or casing 17 is shown enclosing said indexing gears and by these connections the arbor is given the necessary indexing movement. The spiral gear 15 is shown supported by a bracket 18 projecting upwardly from the bottom support 4.

The bottom support 4 is adjustably connected with the base member 2 by means of the screw threaded rod 19 (Fig. 3) which is pivotally mounted on the bottom support 4 and projects downwardly through a slot formed in a part projecting from the base 2. The nut 20 regulates the extent of upward and downward movement of said bottom member 4. The member 4 has also at each side of the machine lugs 21 projecting therefrom and there are screw threaded openings at the upper and lower parts thereof and the member 2 is formed with upright projections having slots 22 whereby the bolts 23 will securely clamp the bottom 4 to the member 2 in both the upper and lower positions thereof.

The arbor 8 is shown supporting a circular blank 24 and in Fig. 2 same is shown in full lines in a substantially central position for receiving slots parallel with the axis of the cutter while in dotted lines is indicated a position for receiving slots at an angle to the cutter axis.

Without further analysis, the foregoing will so fully reveal the gist of this invention that others can, by applying current knowledge, readily adapt it for various utilizations by retaining one or more of the features that, from the standpoint of the prior art, fairly constitute essential characteristics of either the generic or specific aspects of this invention and, therefor, such adaptations should be, and are intended to be, comprehended within the meaning and range of equivalency of the following claims.

Having thus revealed this invention, I claim as new and desire to secure the following combinations and elements, or equivalents thereof, by Letters Patent of United States:—

1. The combination of a machine tool having main guide-ways and a rotary drive shaft arranged parallel and adjacent to said main guide-ways, of a work fixture comprising a base member adapted to be translatably mounted on said guide-ways and moved in the direction of said drive shaft; a frame pivoted on said base member and providing guide-ways; means for supporting said frame in any revolved position; a slide adjustable along said guide-ways on said frame transversely to the adjustment along said main guide-ways; an arbor rotatably supported on said slide; and a driving connection from said rotary shaft to said arbor including a gear concentric with the pivot of said frame, a splined shaft extending along said slide, and intermediate gearing whereby said arbor may be bodily moved to any of its various positions without interfering with said driving connection.

2. A machine tool combining main guideways and a rotary drive shaft arranged parallel and adjacent to said main guideways; and a fixture mounted on said main guide-ways and having mechanism operated from said rotary shaft comprising a base member translatable along said main guideways, a first gear carried by said base having a splined connection with said rotary shaft, a shaft carried by said base member; a frame pivoted on said shaft; guide-ways on said frame; a slide adjustable along said guide-ways on said frame transverse to the movement of said base member, an arbor rotatably mounted on said slide, and a drive connection from said first gear to said arbor including a second gear concentric with said shaft carried by said base member, a splined shaft extending along said slide and driven by said second gear and having a gear slidable thereon for rotating said arbor, whereby said arbor may be bodily moved to any of the positions within the range of adjustments of the mechanism without interfering with said drive connection.

In witness whereof, I have hereunto subscribed my name.

RALPH R. WEDDELL.